US012450699B2

(12) United States Patent
Kao et al.

(10) Patent No.: US 12,450,699 B2
(45) Date of Patent: Oct. 21, 2025

(54) SYSTEM AND METHOD TO ENHANCE OPTICAL BOKEH EFFECT OF COMPUTING DEVICE CAMERAS

(71) Applicant: Dell Products L.P., Round Rock, TX (US)

(72) Inventors: Chih-Hao Kao, Taiwan (TW); Choon Keat Chew, Singapore (SG); Yi-Hsien Lin, Taiwan (TW)

(73) Assignee: Dell Products L.P., Round Rock, TX (US)

( * ) Notice: Subject to any disclaimer, the term of this patent is extended or adjusted under 35 U.S.C. 154(b) by 548 days.

(21) Appl. No.: 17/974,577

(22) Filed: Oct. 27, 2022

(65) Prior Publication Data
US 2024/0144440 A1    May 2, 2024

(51) Int. Cl.
*G06T 5/70* (2024.01)
*H04N 23/62* (2023.01)

(52) U.S. Cl.
CPC .............. *G06T 5/70* (2024.01); *H04N 23/62* (2023.01); *G06T 2207/10028* (2013.01)

(58) Field of Classification Search
CPC ... G06T 5/70; G06T 2207/10028; G06T 5/50; G06T 5/73; G06T 2207/30196; G06T 2207/30201; H04N 23/62; H04N 23/673; H04N 23/959; H04N 23/671; H04N 23/672; H04N 23/675; H04N 23/676; G03B 13/36
See application file for complete search history.

(56) References Cited

U.S. PATENT DOCUMENTS

| | | | | |
|---|---|---|---|---|
| 10,440,251 | B2 * | 10/2019 | Ono | H04N 23/611 |
| 10,521,895 | B2 * | 12/2019 | Tsai | G06T 7/0004 |
| 10,951,835 | B1 * | 3/2021 | Kashiwagi | H04N 23/675 |
| 11,120,528 | B1 * | 9/2021 | Seely | G06T 5/73 |
| 12,243,264 | B2 * | 3/2025 | Nishizawa | G06T 7/74 |
| 2006/0232699 | A1 * | 10/2006 | Suto | H04N 23/673 |
| | | | | 348/E5.045 |
| 2009/0096897 | A1 * | 4/2009 | Saito | H04N 23/673 |
| | | | | 348/241 |
| 2009/0097836 | A1 * | 4/2009 | Tanaka | G03B 15/02 |
| | | | | 396/106 |
| 2009/0160963 | A1 * | 6/2009 | Kim | H04N 23/676 |
| | | | | 348/220.1 |
| 2009/0290041 | A1 * | 11/2009 | Tamaru | G06T 5/70 |
| | | | | 348/222.1 |
| 2010/0007759 | A1 * | 1/2010 | Watanabe | H04N 23/80 |
| | | | | 348/222.1 |
| 2012/0070097 | A1 * | 3/2012 | Adams, Jr. | H04N 23/951 |
| | | | | 382/255 |

(Continued)

*Primary Examiner* — Michael S Osinski
(74) *Attorney, Agent, or Firm* — Terrile, Cannatti & Chambers, LLP; Emmanuel A. Rivera (57) ABSTRACT

Described methods and systems for achieving an optical bokeh effect by a camera supporting a computing device, such as a laptop computer. A measurement is performed as to focus spot position of a subject. The depth of field (DOF) of camera lens is determined. An offset as to the focus spot position is calculated such the background of the subject would be blurred to increase the optical bokeh effect. The offset is added to the focus spot position or to be more in focus to decrease optical bokeh in the background, to arrive at a focus spot position that supports the optical bokeh effect. The camera lens is adjusted for the new focus spot position.

20 Claims, 7 Drawing Sheets

(56) References Cited

U.S. PATENT DOCUMENTS

| | | | | |
|---|---|---|---|---|
| 2013/0272625 A1* | 10/2013 | Cheng | .................. | G06T 5/70 |
| | | | | 382/154 |
| 2014/0233853 A1* | 8/2014 | Fransson | .............. | H04N 23/631 |
| | | | | 382/173 |
| 2015/0092091 A1* | 4/2015 | Ishihara | ............... | H04N 25/674 |
| | | | | 348/222.1 |
| 2017/0148142 A1* | 5/2017 | Park | .................. | G06T 5/70 |
| 2017/0171460 A1* | 6/2017 | Irie | .................. | G03B 17/14 |
| 2017/0200283 A1* | 7/2017 | Yamaguchi | ............ | H04N 23/71 |
| 2019/0141254 A1* | 5/2019 | Kawarada | ............ | H04N 23/671 |
| 2019/0302399 A1* | 10/2019 | Nakamura | ............ | G02B 15/16 |
| 2022/0030139 A1* | 1/2022 | Koppetz | ................. | G06F 3/147 |
| 2022/0067961 A1* | 3/2022 | Tazoe | ................. | G06T 7/62 |
| 2022/0132095 A1* | 4/2022 | Leung | ................. | H04N 13/271 |
| 2022/0156887 A1* | 5/2022 | Lin | .................. | G06T 5/50 |
| 2022/0270215 A1* | 8/2022 | Lee | .................. | G06T 7/536 |
| 2022/0311940 A1* | 9/2022 | Jung | .................. | H04N 23/685 |
| 2023/0032387 A1* | 2/2023 | Mishima | ............... | G06V 10/82 |
| 2023/0199134 A1* | 6/2023 | Jung | .................. | H04N 5/2621 |
| | | | | 348/208.2 |
| 2024/0394852 A1* | 11/2024 | Liba | .................. | G06T 5/70 |
| 2025/0104196 A1* | 3/2025 | Bury | .................. | G06T 5/70 |

* cited by examiner

Depth Of Field Table
400

| Subject Distance (m) 402 | Lens Shift (mm) 404 | Near Field (m) 406 | Far Field (m) 408 |
|---|---|---|---|
| 0.4 | 0.052 | 0.350 | 0.466 |
| 0.5 | 0.042 | 0.424 | 0.608 |
| 0.6 | 0.035 | 0.494 | 0.763 |
| 0.7 | 0.030 | 0.560 | 0.933 |
| 0.8 | 0.036 | 0.622 | 1.120 |

SYSTEM AND METHOD TO ENHANCE OPTICAL BOKEH EFFECT OF COMPUTING DEVICE CAMERAS

BACKGROUND OF THE INVENTION

Field of the Invention

The present invention relates to information handling systems. More specifically, embodiments of the invention provide for achieving an optical bokeh effect for images captured by an information handling system camera.

Description of the Related Art

As the value and use of information continues to increase, individuals and businesses seek additional ways to process and store information. One option available to users is information handling systems. Information handling systems include personal computers (PC), server computers, desktop computers, notebooks, laptops, etc. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems, such a notebooks and laptops, make use of integrated or connected components such as cameras, including web cameras. Such cameras are used to capture images and video, such as video during web conferencing. In certain instances, it may be desirable to focus on a subject and blur the background. This effect is also known as bokeh. Bokeh defined as an effect of a soft out of focus background with the subject in clear focus. The result of good bokeh is an aesthetically pleasing image (video). Overlapping images should blend well and the out of focus background should be smooth.

In cameras of information handling systems, there are software applications that attempt to blur the background of an image or video to achieve a digital bokeh like effect. Software applications use and take up computing resources in producing the digital bokeh effect. Digital bokeh images typically result in noticeable artifacts on edges of the subject (e.g., face of the subject) and the background. This can become more noticeable when a subject or parts of the subject (e.g., hand of the subject) moves during image or video capture. Furthermore, segmenting subject and background by software applications may not be accurate.

SUMMARY OF THE INVENTION

A computer-implementable method, system and computer-readable storage medium for achieving an optical bokeh effect comprising measuring a focus spot position of a subject from a lens of camera; determining a depth of field (DOF) of the lens; calculating an offset to the focus spot position, such that a background of the subject is out of focus; adding the offset to the focus spot position to arrive at a second focus spot position; and adjusting the lens to the second focus spot position.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Implementations described herein provide for a camera included in or connected to an information handling system, such as a laptop computer. The camera includes an image sensor, integrated lens, and autofocus actuator. The image sensor determines a focus spot position to a subject. To achieve an optical bokeh effect, a determination is performed as to a depth of field as to the lens, and adjustments performed to adjust the focus spot position and depth of field, such that the background of the subject is blurred.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, gaming, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a microphone, keyboard, a video display, a mouse, etc. The information handling system may also include one or more buses operable to transmit communications between the various hardware components.

Figure 1:
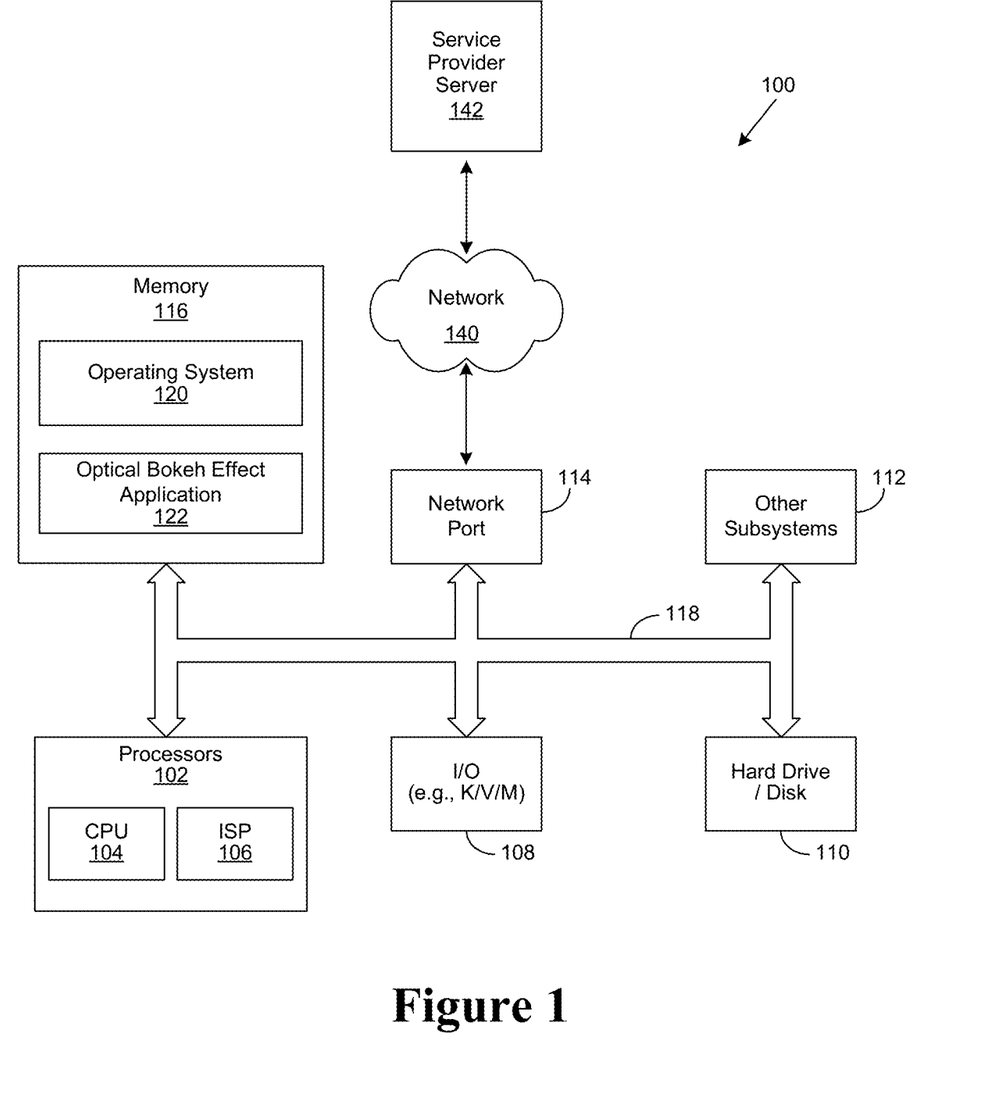
FIG. 1 is a general illustration of components of an information handling system as implemented in the present invention.

FIG. 1 is a generalized illustration of an information handling system 100. The information handling system 100 can be implemented as a computer, such as a desktop, server, tablet, laptop, or notebook, etc. The information handling system 100 includes processor(s) 102, such as a central processor unit or "CPU" 104 and an image signal processor or "ISP" 106. The information handling system 100 further includes input/output (I/O) devices 108, such as a microphone, a keyboard, a video/display, a mouse, and associated controllers (e.g., K/V/M), a hard drive or disk storage 110, and various other subsystems 112.

Various implementations provide for the I/O devices 108 to be external peripheral devices, such as keyboards, webcams, monitors, displays, etc. In particular, I/O devices 104 can include cameras, such as web cameras, as further described herein.

Implementations provide for such external devices are connected using cables based on standards such as universal serial bus (USB), including USB Type C. In certain, implementations, cameras, such web cameras described herein are external devices that are connected by the cables implementing standards, such as USB. Webcam can be the internal device as well such as embedded into a display or laptop.

In various embodiments, the information handling system 100 also includes network port 114 operable to connect to a network 140, where network 140 can include one or more wired and wireless networks, including the Internet. Network 140 is likewise accessible by a service provider server 142. The information handling system 100 likewise includes system memory 116, which is interconnected to the foregoing via one or more buses 118. System memory 116 can be implemented as hardware, firmware, software, or a combination of such. System memory 116 further includes an operating system (OS) 120. Embodiments provide for the system memory 116 to include an optical bokeh effect application 118. In various implementations, parameter settings are sent to the ISP 106 for execution. The various processes described herein are performed by the optical effect application 118. Implementations provide for the optical bokeh effect application 118 include an autofocus (AF) algorithm that controls an autofocus actuator to adjust for a depth of field (DOF) of a camera lens, to provide an optical bokeh effect. The optical bokeh application 118 further is configured to determine an optimal focus value and focus spot position, and provide offset to the focus spot position to enhance the optical bokeh effect to images.

Figure 2:
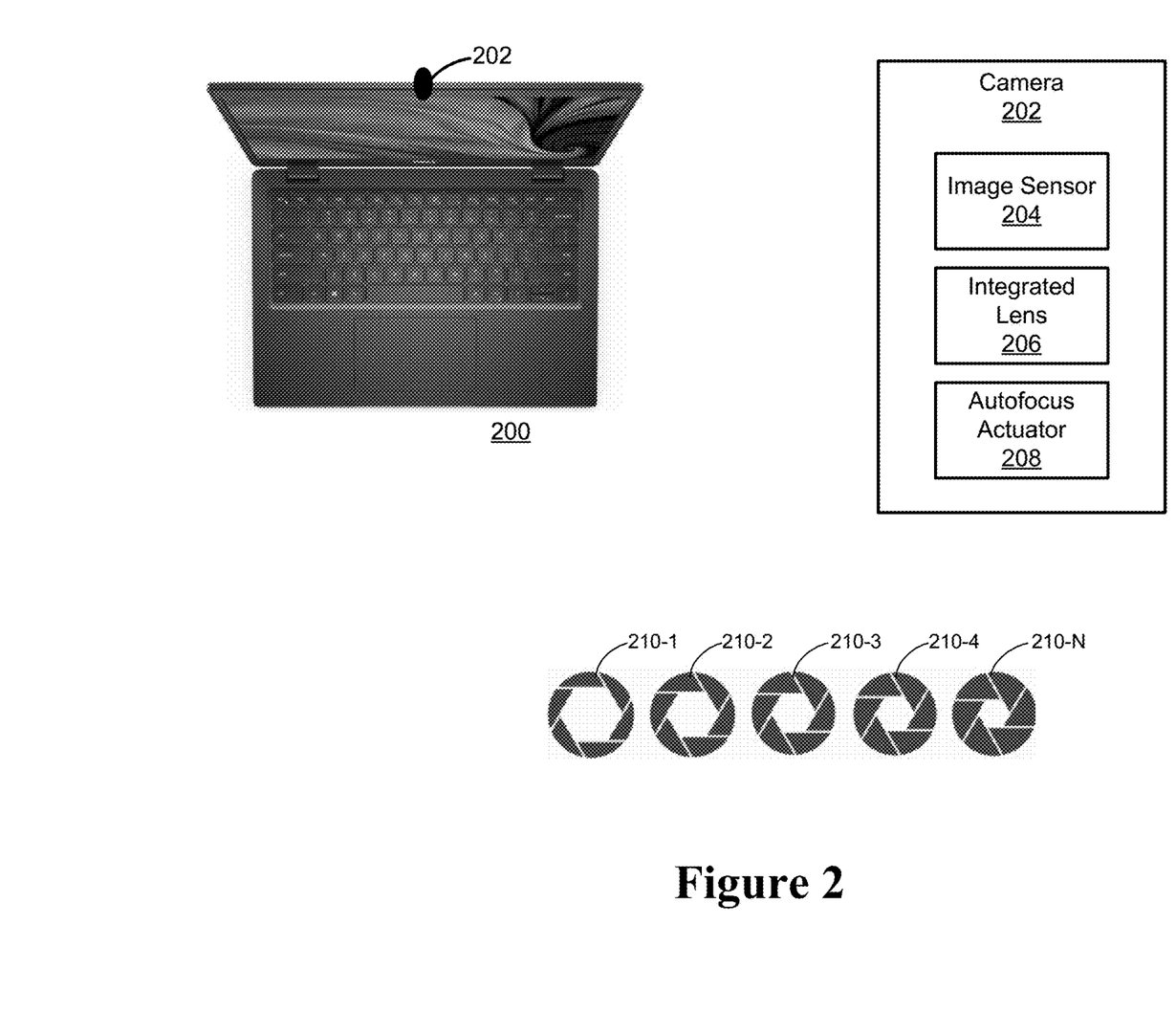
FIG. 2 illustrates a camera as implemented in the present invention.

FIG. 2 shows a laptop computer 200 that can be implemented as an information handling system (IHS) 100 described in FIG. 1. The laptop computer 200 includes an integrated camera 202. In certain implementations, camera 202 is connected to the laptop computer 200 as an external device. Implementations can also provide for an integrated camera 202 and other similarly configured externally connected cameras. The camera is controlled by the optical bokeh effect application described above.

Implementations provide for the camera 202 to include an image sensor 204 which is configured to capture images (video) for processing by the laptop computer 200. Image sensor 204 can be of varying sizes, capturing different images of different sizes (e.g., megapixels). Implementations can provide for autofocusing of images on to the image sensor 204, based on contrast detection, and in certain implementations, phase detection. As described herein, such auto focusing can be adjusted to provide for an optical bokeh effect.

Camera 202 further includes an integrated lens 206, which is used to focus and capture images. The integrated lens 206 can have a particular focal length, which determines a field of view to capture images. Furthermore, integrated lens 206 includes an aperture or opening as described below. Camera 202 includes an autofocus actuator 208 that is used to move the integrated lens 206 into a focus spot position as further described herein. Implementations provide for autofocusing used for image sensor 204 to determine an initial focus spot position, and adjustment for an optical bokeh effect to move the focus spot position. Implementations provide for the autofocus actuator 208 to be implemented with a step motor, voice coil motor, piezoelectric motor, etc.

The integrated lens 202 includes an aperture or opening 210. In certain implementations, the aperture 210 can be fixed. Other implementations provide for an adjustable aperture 210 that provides different size openings as illustrated by apertures 210-1 to 210-N. The larger the opening or aperture, the shorter the depth of field (DOF). The smaller the opening or aperture, the longer the DOF. For example, aperture 210-1 has the shortest depth of field, and aperture 210-N has the longest depth of field.

Figure 3:
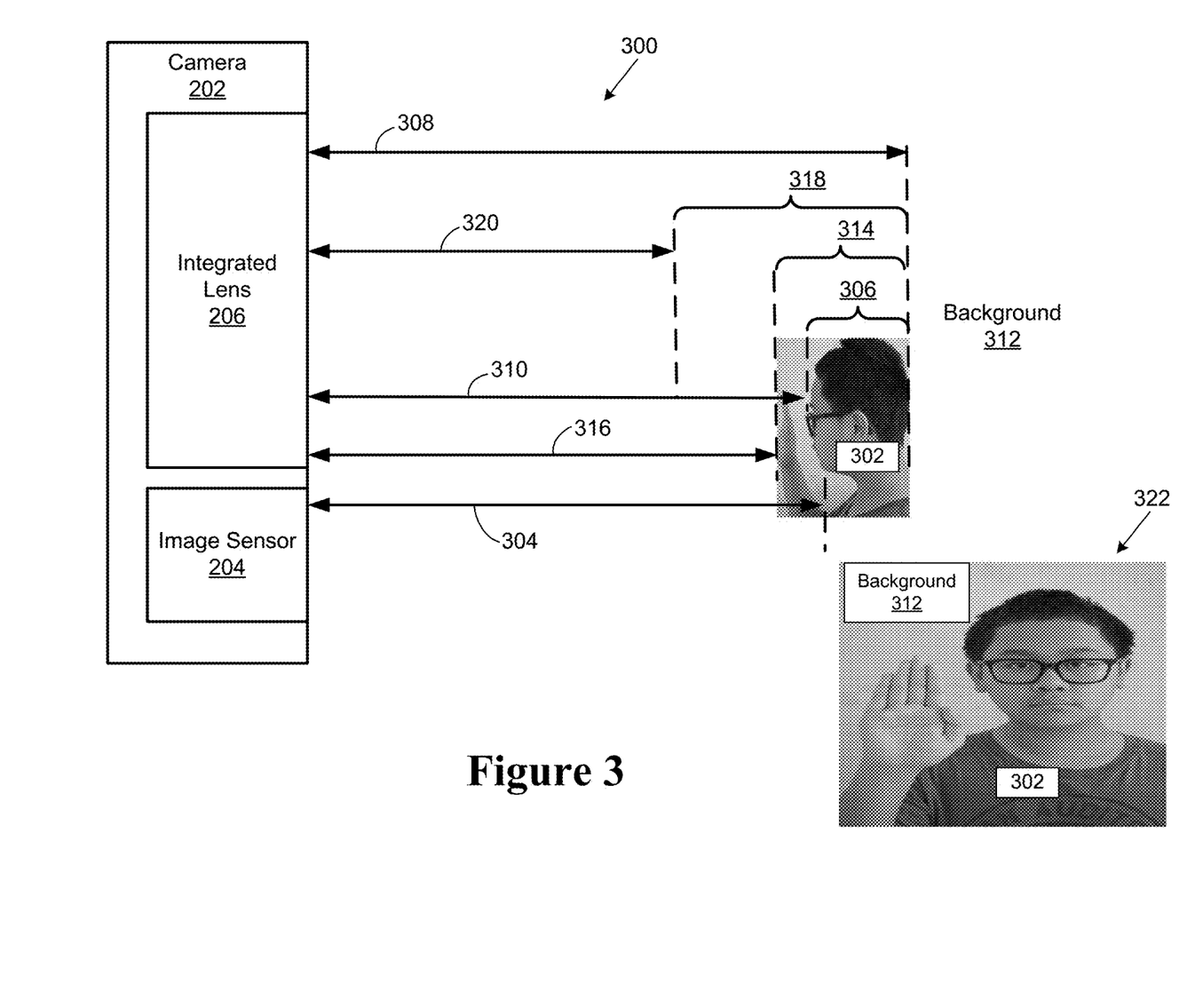
FIG. 3 illustrates depth of fields and focus spot positions.

FIG. 3 shows various depth of fields and focus spot positions 300 to a subject 302 from camera 202. An initial focus spot position 304 can be determined as to subject 302, where the initial focus spot position 304 is a specific distance from the camera integrated lens 206. Image sensor 204 can provide the initial focus spot position 304 through autofocusing which can use processes such as contrast detection and phase detection.

As discussed, different size apertures 210 account for different lengths of depth of field (DOF). For a relatively large aperture or opening, such as 210-1, a shorter DOF can be realized. For example, DOF 306 can be realized for a large aperture, such that only the face of subject 302 is in focus. Objects with the DOF 306 are in focus, while objects outside of the DOF 306 are out of focus or blurred. DOF 306 includes a far field point 308 and a near field point 310. Therefore, objects before the near field point 310 are out of focus, and objects, such as background 312, that are beyond far field point 308 are out focus or blurred. An optical bokeh effect can be achieved by aligning DOF 306 with the face of the subject 302.

In other implementations, the longer DOF 314 can be provided that covers the hand and face of the subject 302. Implementing the same integrated lens with the same focal length, a smaller aperture allows for a longer DOF 314. Far field point 308 remains the same to allow for a blurred background 312; however, a near field point 316 allows for the hand of the subject 302 to be in focus.

For implementations, with a fixed aperture or opening, DOF is not changed. In various implementations, DOF is changed if a focus point of a focus distance is a different distance. If focus point is at near point, a shorter DOF can be used. If focus point is at a far point, a longer DOF is used. To properly support an optical bokeh effect, the DOF should be long enough to cover subject 302. In these implementations, a shift of the focus spot position can be performed to adjust for a blurred background 310. For example, a fixed aperture can provide a DOF 318. If the focus spot position 304 is used as the center for DOF 318, then a portion of the background remains in focus, and an optical bokeh effect is not achieved. Adjustment is performed to shift the DOF 318, such that the far field point is far field point 308. The shifted DOF 318 has a near field point 320. Therefore, adjustment is made such that the focus position is at a near field point, and not on subject 302, changing the DOF range while the subject 302 is still covered by the changed DOF range. The subject 302 including the hand of the subject 302 is in focus, as are all objects that are beyond near field point 320 and before far field point 308. The background 312 remains out of focus or blurred. In certain implementations, the DOF can be extended to shift the focus to a far point in order to cover the subject and background.

For the different DOF instances described above, a resulting optical bokeh effect image 322 can be realized, with an in-focus subject 302 and blurred background 312.

Figure 4:
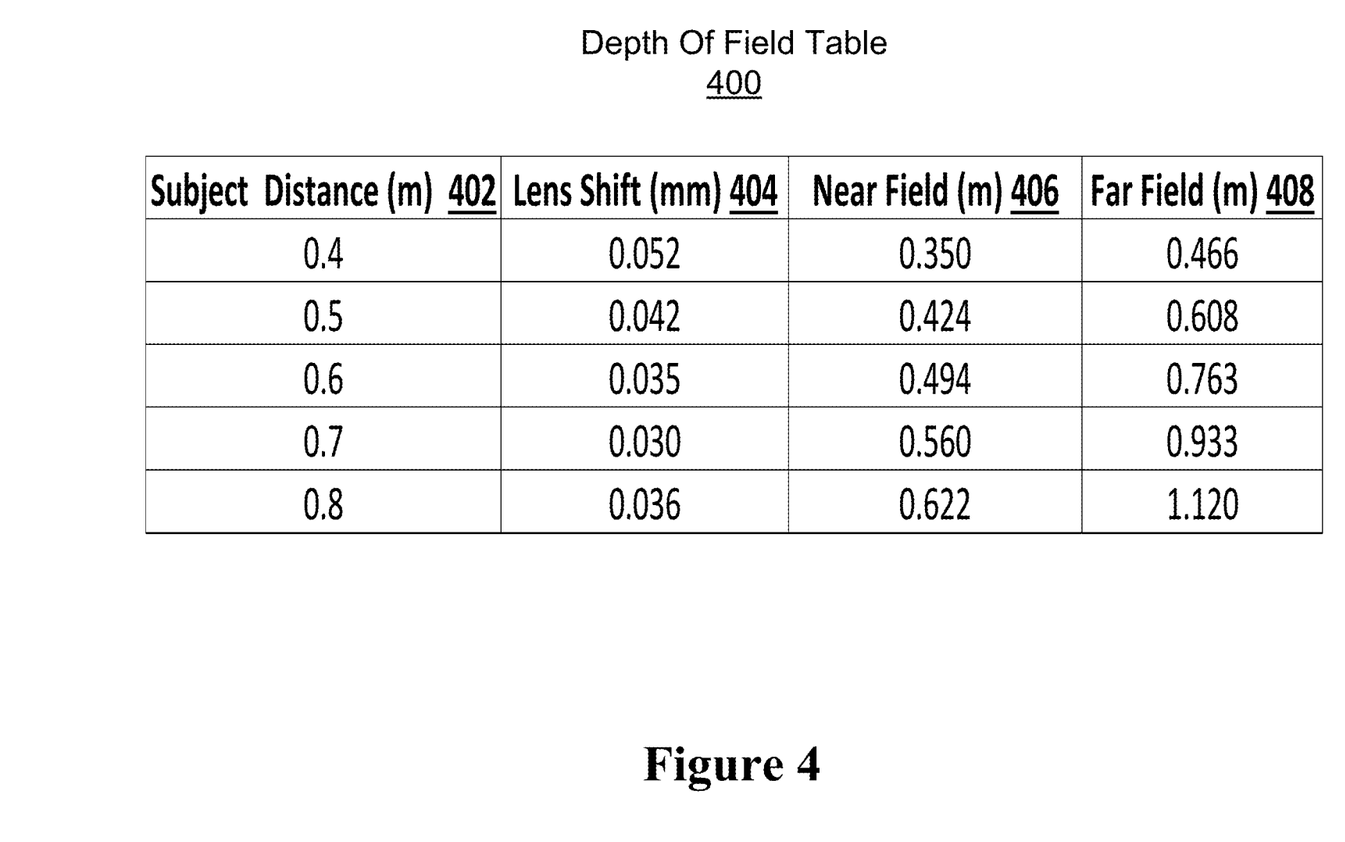
FIG. 4 illustrates a depth of field (DOF) table.

FIG. 4 shows a depth of field (DOF) table 400, and example values. As an example, the values of table 400 are derived using a Sony™ IMX334 image sensor (i.e., image sensor 204), a lens with an f stop (aperture) of 1.8, and focal length of 4.5 mm (i.e., integrated lens 206), and a step motor (i.e., autofocus actuator 208). In this example, A lens shift adjustment is performed to achieve an optical bokeh effect. For various subject distances 402, the lens shift 404 adjustment is provided to achieve a near field value 406 and a far field value 408 for the DOF. For example, if an object/subject is at 0.6 m, the focus distance (Subject distance 402) could be 0.5 m and 0.6 m. The DOF range can cover the object/subject at 0.6 m, but a 0.5 m focal distance uses a shorter DOF, then the background will be blurred at a focus distance focus of 0.6 m. The table 400 can be used to provide offset values (lens shift 404), allowing the subject 302 to remain in focus and strengthen the optical bokeh effect with a blurred background.

Figure 5:
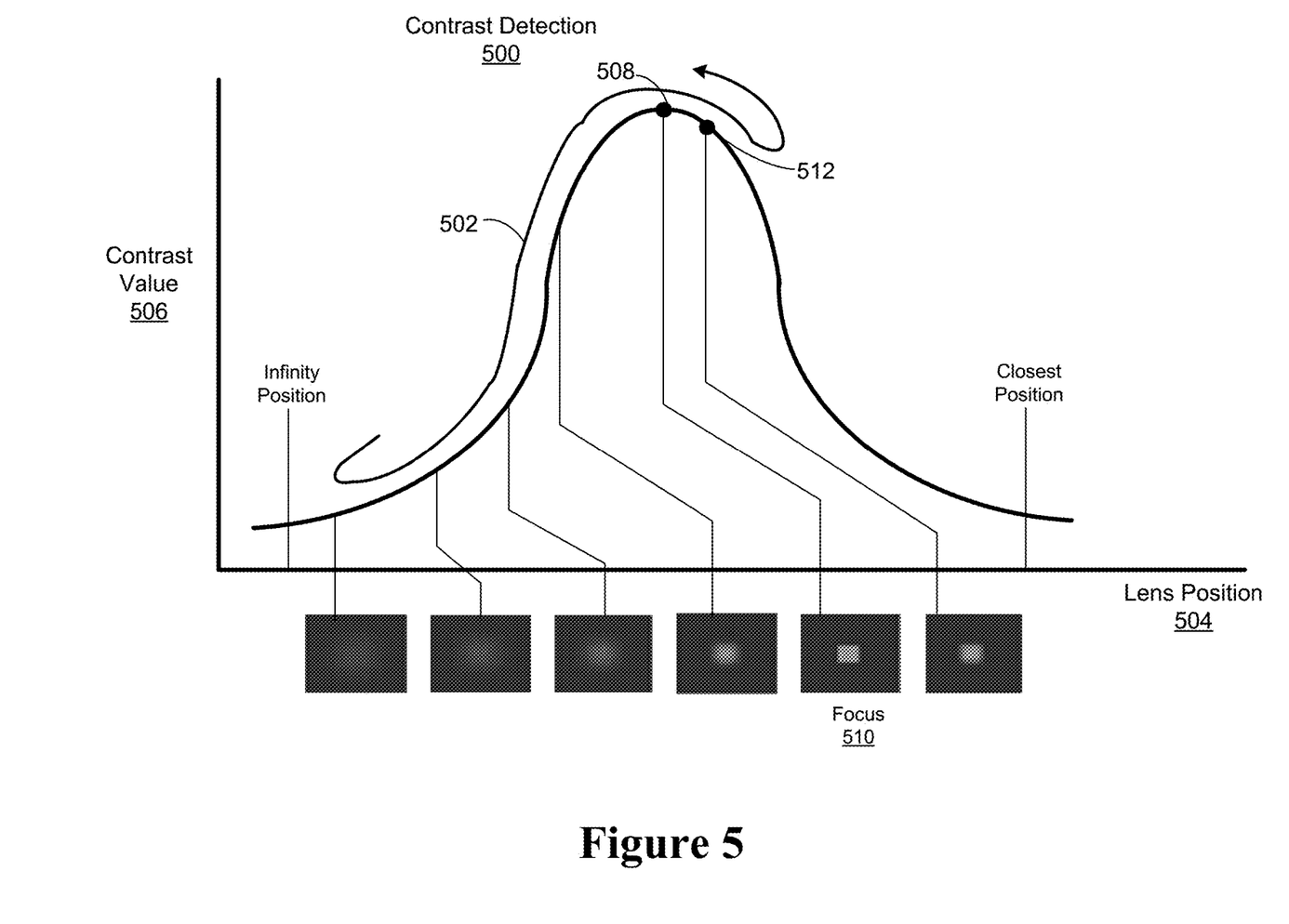
FIG. 5 illustrates contrast detection in finding a focus spot position.

FIG. 5 shows contrast detection 500 in finding a focus spot position. A curve 502 represents contrast values for a subject 302 at a distance from a camera 202. Lens position 504 is plotted against contrast value 506. When the curve 502 achieves the highest contrast value at position 508, a focus spot position 510 is indicated. For an optical bokeh effect, the position 508 is shifted to position 512.

Figure 6:
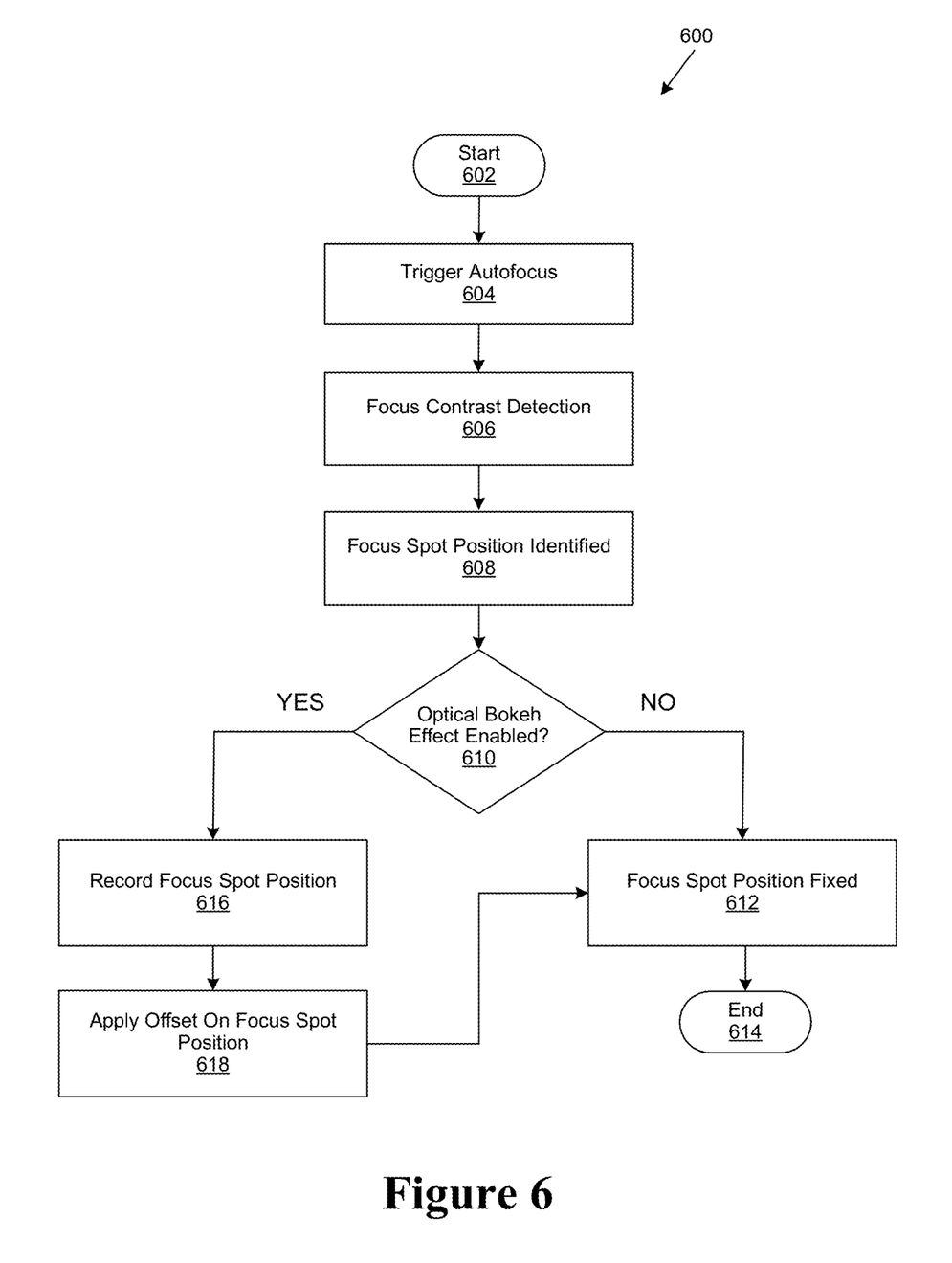
FIG. 6 is a generalized flowchart for providing an offset to achieve an optical bokeh effect.

FIG. 6 is a generalized flowchart for providing an offset to achieve an optical bokeh effect. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At step 602, the process 600 starts. At step 604, autofocusing is initiated. The autofocus triggering can be initiated when camera 202 focuses in on a subject 302. At step 606, focus contrast detection is performed, which determines if the subject is in focus. This can be performed using the image sensor 204. At step 608, from the focus contrast detection, a focus spot position is identified. At step 610, a determination is performed as to whether the optical bokeh effect is enabled. If the optical bokeh effect is not enabled, following the NO branch of step 610, at step 612, the focus spot position is fixed. At step 614, the process 600 ends. If the optical bokeh effect is enabled, following the YES branch of step 610, at step 616, the focus spot position is recorded. At step 618, offset is applied to the focus spot position. Step 612 is performed. At step 614, the process 600 ends.

Figure 7:
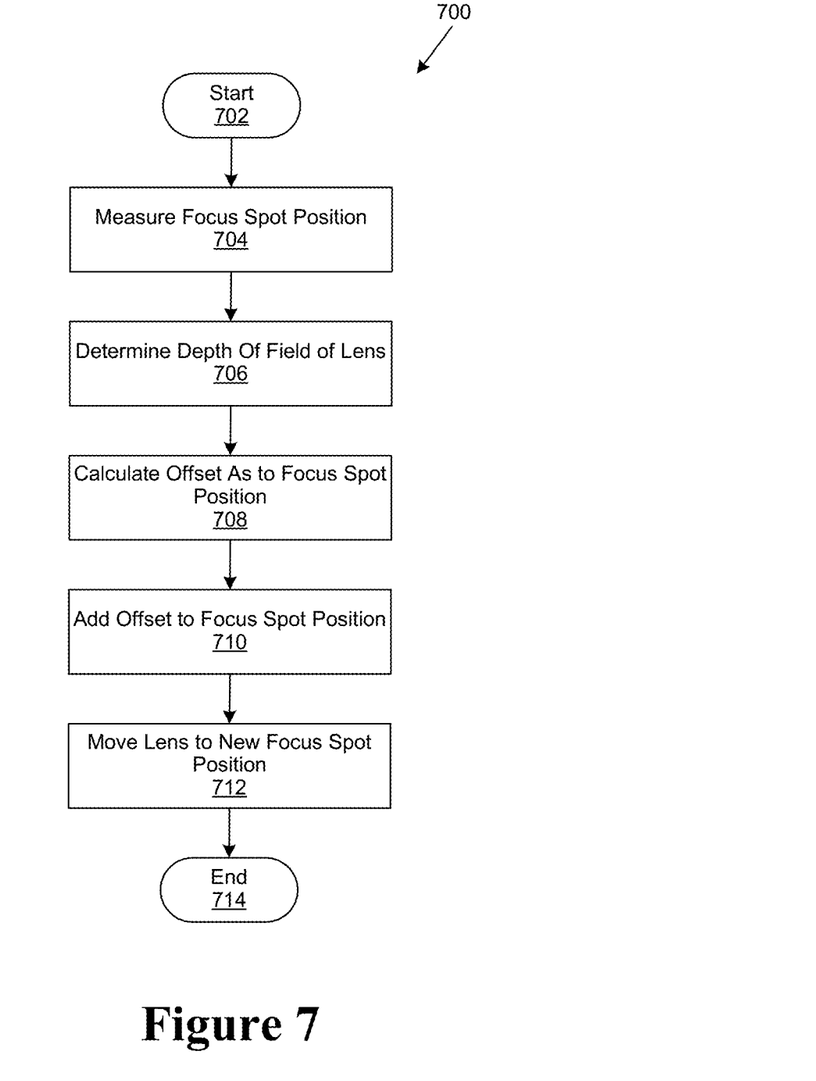
FIG. 7 is a generalized flowchart for achieving an optical bokeh effect of images captured by an information handlings system camera.

FIG. 7 is a generalized flowchart for achieving an optical bokeh effect of images captured by an information handlings system camera. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At step 702, the process 700 starts. At step 704, a focus spot position to a subject is measured. Implementations provide for the image sensor 204 through contrast detection to be used in measuring the focus spot position.

At step 706, a determination is performed as to the depth of field (DOF) of the integrated lens 206. The DOF can already be known and looked up, based on the aperture of the integrated lens 206.

At step 708, an offset as to the focus spot position is calculated, such that the background of the subject is out of focus. The offset can be provided from predetermined values, such as describe in table 400.

At step 710, the offset is added to the focus spot position to arrive at new focus spot position that will achieve the optical bokeh effect.

At step 712, the integrated lens 206 is adjusted by the autofocus actuator 208 to the new focus spot position. At step 714, the process 700 ends.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Embodiments of the invention are described with reference to flowchart illustrations and/or step diagrams of methods, apparatus (systems) and computer program products according to embodiments of the invention. It will be understood that each step of the flowchart illustrations and/or step diagrams, and combinations of steps in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram step or steps.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram step or steps.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A computer-implementable method for achieving an optical bokeh effect comprising:
    measuring a focus spot position of a subject from a lens of camera, wherein the subject is a set distance from the lens;
    determining a depth of field (DOF) of the lens;
    calculating an offset to the focus spot position, such that a background of the subject is out of focus;
    adding the offset to the focus spot position to arrive at a second focus spot position, wherein the set distance of the subject from the lens remains the same; and
    adjusting the lens to the second focus spot position.

2. The computer-implementable method of claim 1, wherein the measuring is through autofocusing that implements contrast detection.

3. The computer-implementable method of claim 2, wherein the contrast detection implements a contrast detection curve.

4. The computer-implementable method of claim 1, wherein the DOF is based on one or more aperture settings of the lens.

5. The computer-implementable method of claim 1, wherein the camera is integrated into an information handling system.

6. The computer-implementable method of claim 1, wherein the adjusting accounts for far field point of the DOF to be at the blur background of the subject.

7. The computer-implementable method of claim 1, wherein one of a step motor, voice coil motor, or piezoelectric motor is used in adjusting the lens.

8. An information handling system (IHS) comprising:
    a processor;
    a data bus coupled to the processor; and
    a non-transitory, computer-readable storage medium embodying computer program code, the non-transitory, computer-readable storage medium being coupled to the data bus, the computer program code interacting with a plurality of computer operations for achieving an optical bokeh effect comprising instructions executable by the processor and configured for:
        measuring a focus spot position of a subject from a lens of camera, wherein the subject is a set distance from the lens;
        determining a depth of field (DOF) of the lens;
        calculating an offset to the focus spot position, such that a background of the subject is out of focus;
        adding the offset to the focus spot position to arrive at a second focus spot position, wherein the set distance of the subject from the lens remains the same; and
        adjusting the lens to the second focus spot position.

9. The information handling system (IHS) of claim 8, wherein the measuring is through autofocusing that implements contrast detection.

10. The information handling system (IHS) of claim 9, wherein the contrast detection implements a contrast detection curve.

11. The information handling system (IHS) of claim 8, wherein the DOF is based on one or more aperture settings of the lens.

12. The information handling system (IHS) of claim 8, wherein the camera is integrated into the IHS.

13. The information handling system (IHS) of claim 8, wherein the adjusting accounts for far field point of the DOF to be at the blur background of the subject.

14. The information handling system (IHS) of claim 8, wherein one of a step motor, voice coil motor, or piezoelectric motor is used in adjusting the lens.

15. A non-transitory, computer-readable storage medium embodying computer program code for execution by a processor for achieving an optical bokeh effect, the computer program code comprising computer executable instructions configured for:
    measuring a focus spot position of a subject from a lens of camera, wherein the subject is a set distance from the lens;
    determining a depth of field (DOF) of the lens;
    calculating an offset to the focus spot position, such that a background of the subject is out of focus;
    adding the offset to the focus spot position to arrive at a second focus spot position, wherein the set distance of the subject from the lens remains the same; and
    adjusting the lens to the second focus spot position.

16. The non-transitory, computer-readable storage medium of claim 15, wherein the measuring is through autofocusing that implements contrast detection.

17. The non-transitory, computer-readable storage medium of claim 16, wherein the contrast detection implements a contrast detection curve.

18. The non-transitory, computer-readable storage medium of claim 15, wherein the DOF is based on one or more aperture settings of the lens.

19. The non-transitory, computer-readable storage medium of claim 15, wherein the camera is integrated into an information handling system.

20. The non-transitory, computer-readable storage medium of claim 15, wherein one of a step motor, voice coil motor, or piezoelectric motor is used in adjusting the lens.

* * * * *